United States Patent
Mittra et al.

(10) Patent No.: US 12,425,749 B2
(45) Date of Patent: Sep. 23, 2025

(54) METHOD AND APPARATUS TO EFFICIENTLY READ SUPER-BINNED ARRAY OUT FROM SENSOR OF HIGHER RESOLUTION

(71) Applicant: OMNIVISION TECHNOLOGIES, INC., Santa Clara, CA (US)

(72) Inventors: Amit Mittra, Irvine, CA (US); Kevin Johnson, Kildeer, IL (US); Hiroaki Ebihara, San Jose, CA (US); Kenny Geng, Mountain View, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 119 days.

(21) Appl. No.: 18/393,135

(22) Filed: Dec. 21, 2023

(65) Prior Publication Data

US 2024/0314460 A1 Sep. 19, 2024

Related U.S. Application Data

(60) Provisional application No. 63/490,478, filed on Mar. 15, 2023.

(51) Int. Cl.
*H04N 25/46* (2023.01)
*H04N 25/77* (2023.01)
*H04N 25/78* (2023.01)

(52) U.S. Cl.
CPC ............. *H04N 25/46* (2023.01); *H04N 25/77* (2023.01); *H04N 25/78* (2023.01)

(58) Field of Classification Search
None
See application file for complete search history.

(56) References Cited

U.S. PATENT DOCUMENTS

2022/0116557 A1\* 4/2022 Lee ...................... H10F 39/811

\* cited by examiner

*Primary Examiner* — Mark T Monk
(74) *Attorney, Agent, or Firm* — Dorsey & Whitney LLP

(57) ABSTRACT

A pixel includes a photosensor configured to photogenerate charge in response to incident light. A floating diffusion is configured to receive the charge photogenerated by the photosensor. A transfer transistor is coupled between the floating diffusion and the photosensor. A dual floating diffusion (DFD) transistor is coupled to the floating diffusion. A binning node is coupled to the DFD transistor. A floating diffusion interconnect grid is coupled to the binning node of the pixel and a binning node of a second pixel. The pixel and the second pixel are included in a pixel array. The DFD transistor is configured to couple the binning node to the floating diffusion when activated during a readout operation of the pixel array to provide a binned readout, and the DFD transistor is configured not to couple the binning node to the floating diffusion when deactivated to provide a full resolution readout.

20 Claims, 4 Drawing Sheets

METHOD AND APPARATUS TO EFFICIENTLY READ SUPER-BINNED ARRAY OUT FROM SENSOR OF HIGHER RESOLUTION

CROSS-REFERENCE TO RELATED APPLICATION

The present application claims the benefit of U.S. Provisional Patent Application No. 63/490,478, filed Mar. 15, 2023, the disclosure of which is incorporated herein by reference in its entirety.

TECHNICAL FIELD

This disclosure relates generally to image sensors, and in particular but not exclusively, relates to complementary metal oxide semiconductor (CMOS) image sensors with pixel binning.

BACKGROUND

Image sensors have become ubiquitous and are now widely used in digital cameras, cellular phones, security cameras, as well as medical, automobile, and other applications. As image sensors are integrated into a broader range of electronic devices, it is desirable to enhance their functionality, performance metrics, and the like in as many ways as possible (e.g., resolution, power consumption, dynamic range, etc.) through both device architecture design as well as image acquisition processing.

A typical image sensor operates in response to image light from an external scene being incident upon the image sensor. The image sensor includes an array of pixels having photosensitive elements (e.g., photodiodes) that absorb a portion of the incident image light and generate image charge upon absorption of the image light. The image charge photogenerated by the pixels may be measured as analog output image signals on column bitlines that vary as a function of the incident image light. In other words, the amount of image charge generated is proportional to the intensity of the image light, which is read out as analog image signals from the column bitlines and converted to digital values to provide information that is representative of the external scene.

BRIEF DESCRIPTION OF THE DRAWINGS

Non-limiting and non-exhaustive embodiments of the present technology are described below with reference to the following figures, in which like or similar reference characters are used to refer to like or similar components throughout unless otherwise specified. Additional details of the present technology are described in Appendix A.

Figure 1:
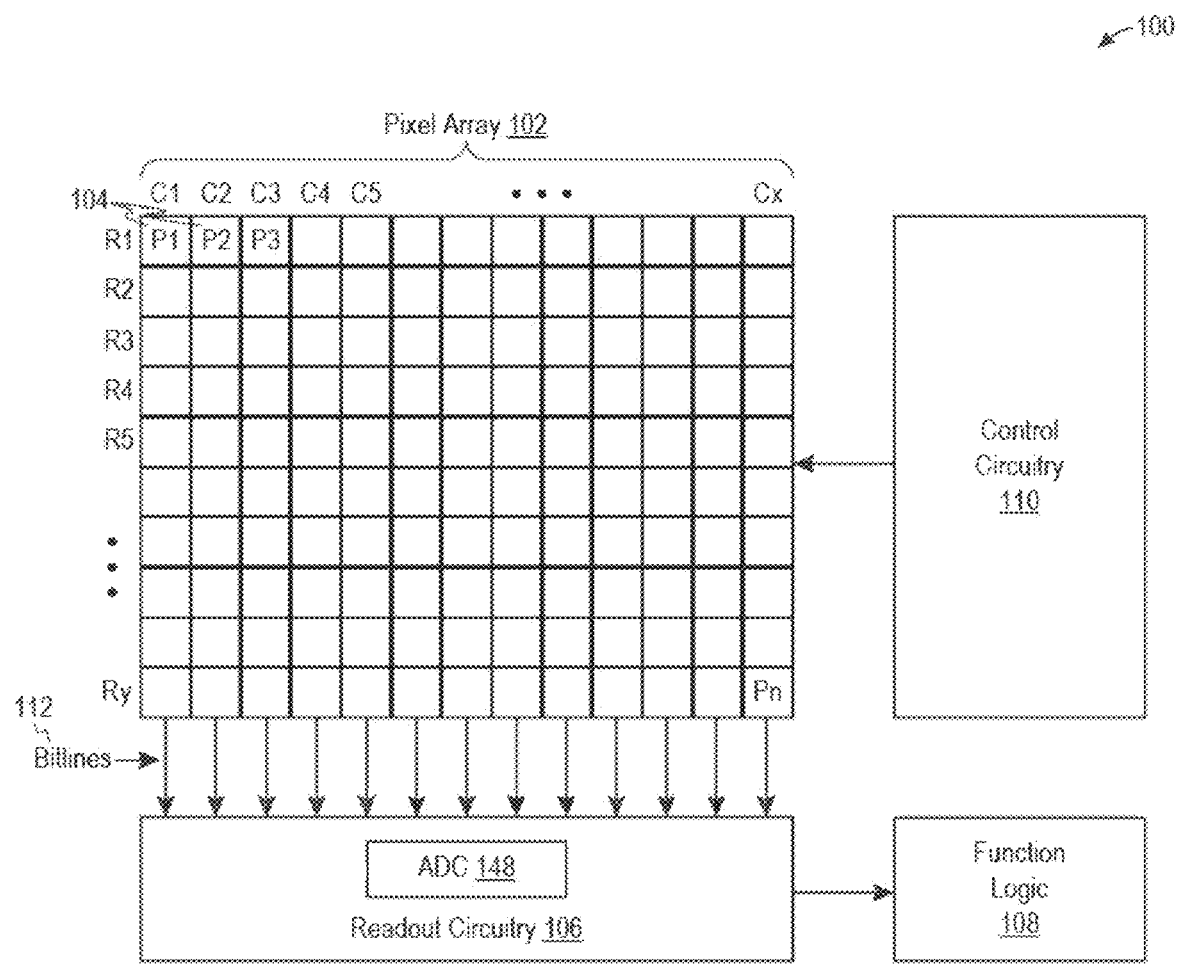
FIG. 1 illustrates one example of an imaging system including a pixel array in accordance with the teachings of the present technology.

Skilled artisans will appreciate that elements in the figures and in Appendix A are illustrated for simplicity and clarity and are not necessarily drawn to scale. For example, the dimensions of some of the elements in the figures and in Appendix A may be exaggerated relative to other elements to aid in understanding of various aspects of the present technology. In addition, common but well-understood elements or methods that are useful or necessary in a commercially feasible embodiment are often not depicted in the figures or in Appendix A, or described in detail below to avoid unnecessarily obscuring the description of various aspects of the present technology.

DETAILED DESCRIPTION

This disclosure relates generally to image sensors. For example, several embodiments of the present technology relate to CMOS image sensors included in pixel arrays, such as for example a 640×640 pixel array from which ultra-low power 64×64 readouts of 10×10 blocks of pixels are implemented with pixel level floating diffusion super binning. In the following description, specific details are set forth to provide a thorough understanding of aspects of the present technology. One skilled in the relevant art will recognize, however, that the systems, devices, and techniques described herein can be practiced without one or more of the specific details set forth herein, or with other methods, components, materials, etc.

Reference throughout this specification to an "example" or an "embodiment" means that a particular feature, structure, or characteristic described in connection with the example or embodiment is included in at least one example or embodiment of the present technology. Thus, use of the phrases "for example," "as an example," or "an embodiment" herein are not necessarily all referring to the same example or embodiment and are not necessarily limited to the specific example or embodiment discussed. Furthermore, features, structures, or characteristics of the present technology described herein may be combined in any suitable manner to provide further examples or embodiments of the present technology.

Spatially relative terms (e.g., "beneath," "below," "over," "under," "above," "upper," "top," "bottom," "left," "right," "center," "middle," and the like) may be used herein for ease of description to describe one element's or feature's relationship relative to one or more other elements or features as illustrated in the figures. It will be understood that the spatially relative terms are intended to encompass different orientations of a device or system in use or operation, in addition to the orientation depicted in the figures. For example, if a device or system illustrated in the figures is rotated, turned, or flipped about a horizontal axis, elements or features described as "below" or "beneath" or "under" one or more other elements or features may then be oriented "above" the one or more other elements or features. Thus, the exemplary terms "below" and "under" are non-limiting and can encompass both an orientation of above and below. The device or system may additionally, or alternatively, be otherwise oriented (e.g., rotated ninety degrees about a vertical axis, or at other orientations) that illustrated in the figures, and the spatially relative descriptors used herein are interpreted accordingly. In addition, it will also be understood that when an element is referred to as being "between"

two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

A. OVERVIEW

As will be discussed, various examples of a CMOS imaging system with pixel array are disclosed. In various examples, ultra-low power binned 64×64 readouts of 10×10 blocks of pixels from a 640×640 pixel array are implemented with pixel level floating diffusion super binning where the 10×10 pixels may be binned at the floating diffusions with floating diffusion interconnect grids inside the pixel array. Typical binning methods to get binned 64×64 pixels involves 10 rows of pixels binned vertically with source follower transistors and 10 columns of pixels binned horizontally in columns. In these examples, each row reads out 64 10×10 pixels in parallel with column analog to digital converters (ADCs). Typical frame times to readout rows 64 times would therefore be for example 64*line time (e.g., 5 µs), or approximately 320 µs. Readout bandwidth is reduced by reducing the data clock and allowing unused columns to be turned off.

However, the issue of reducing power consumption remains. In particular, the data paths are designed to accommodate higher resolutions and frame readout duty cycling efficiency is only reduced by approximately 1/10x, as for example a readout of 640 total rows is reduced to 64 binned row readouts. In addition, data transmission poses additional challenge. Interfaces, such as for example the I3C data transmission interface are not fast enough and therefore require on-chip static random access memories (SRAMs) to store data, which impacts power and area. Further, it is appreciated that the Mobile Industry Processor Interface (MIPI) TX standard is not very efficient in data transmission at lower bandwidths.

In the examples described herein, super-binned pixel arrays are read out at high resolutions with improved efficiency, providing for example an ultra-low power readout of 64*10 pixels per line time, and/or an ultra-low power readout of a 64×64 binned array of 10×10 blocks of pixels from a 640×640 pixel array. In the various examples, super binning is realized with 10×10 pixels binned at the floating diffusions with floating diffusion interconnect grids inside the 10×10 blocks of pixels in the pixel array. In the various examples, each 10×10 block of pixels is coupled to existing bitlines using a dedicated source follower transistor and row select transistor coupled to a specific bitline of the respective 10×10 block of pixels. In the other examples, each 10×10 block of pixels is coupled to existing bitlines using two or more source follower transistors and row select transistors that are coupled to the specific bitline of the respective 10×10 block of pixels. As such, 8 vertical 10×10 blocks of pixels can be readout simultaneously through their respective dedicated source follower transistor and row select transistors and/or through the specific bitlines of the respective 10×10 block of pixels, which reduces frame times in various examples to 64/8*line times (e.g., approximately 40 µs) from 64 line times in traditional approaches (which require approximately 320 µs).

It is appreciated that the present technology can be implemented with other sizes and arrangements of pixels. For example, in some embodiments, the size of each block of pixels can be 4×4, 8×8, or another size. In some embodiments, the number of vertical blocks of pixels readout simultaneously can be 4, 6, 10, or another number.

B. SELECTED EMBODIMENTS OF IMAGE SENSORS WITH BINNED 10×10 BLOCKS OF PIXELS OR FULL RESOLUTION PIXELS AND METHODS FOR READING THE SAME

To illustrate, FIG. 1 is a block diagram of one example of an imaging system 100 configured in accordance with various embodiments of the present technology. As shown, the imaging system 100 includes a pixel array 102, readout circuitry 106, function logic 108, and control circuitry 110. The pixel array can be a two-dimensional (2D) array including a plurality of pixels 104 (identified individually in FIG. 1 as pixel PI through pixel Pn) that are arranged in rows (identified individually in FIG. 1 as row R1 through row Ry) and columns (identified individually in FIG. 1 as column C1 to column Cx). The pixels 104 are each configured to acquire image charge in response to incident light received from an external scene, and to generate a corresponding analog image charge data signal based at least in part on the acquired image charge.

In various examples, it is noted that pixel array 102 may be a 640×640 pixel array. In such an example, x=640 and y=640 such that the rows in FIG. 1 may be identified individually as row R1 through row R640, and the columns in FIG. 1 may be identified individually as column C1 through column C640. In the various examples, the pixels 104 in pixel array 102 are also organized or arranged into 10×10 blocks of pixels 104. As such each 10×10 block of pixels 104 includes 100 pixels 104. Thus, a first 10×10 block of pixels includes the pixels in rows R1-R10 and columns C1-C10, and a second 10×10 block of pixels includes the pixels in rows R11-R20 and columns C1-C10, and so on. As a result, the pixel array 102 is arranged or organized into a 64×64 groupings of 10×10 blocks of pixels 104.

After each pixel 104 has acquired image charge, the corresponding analog image charge data signals are read out of the pixel array 102 along column bitlines 112 and into analog to digital converter (ADC) 148, which is included in the readout circuitry 106 as shown. As will be discussed in greater detail below, in a full resolution mode, a full resolution readout of each pixel 104 may be readout out from pixel array 102 through bitlines 112. In a binning mode, an ultra-low power readout of 10×10 blocks of pixels may be readout from the pixel array 102 through bitlines 112. When in the full resolution mode, each pixel 104 is readout through its respective source follower transistor, row select transistor, and bitline 112. In one example, when in the binning mode, each 10×10 block of pixels is readout through a dedicated source follower transistor, row select transistor, and bitline 112 of the respective 10×10 block of pixels. In another example, when in the binning mode, each 10×10 block of pixels is readout through the two or more source follower transistors and the two or more row select transistors that are coupled to a specific bitline 112 of the respective 10×10 block of pixels.

As mentioned, when the analog image charge data signals (i.e., full resolution signals from each pixel or binned signals from the pixels of the 10×10 blocks of pixels) are read into the readout circuitry 106, the analog image charge data signals can be converted into digital values (digital representations) using ADC 148. The digital representations of the analog image charge data signals may then be transferred from the readout circuitry 106 to the function logic 108. In various examples, the data may be transferred through a data transmission interface, such as for example according to the MIPI 13C data transmission interface specification, or other suitable data transmission interface. In some examples, the function logic 108 is configured to simply store the digital representations as image data. In other examples, the function logic 108 can be configured to manipulate the image data (e.g., by applying post image effects, such as crop, rotate, red eye removal, brightness adjustment, contrast adjustment, etc.) in addition to storing the image data. The image data can be used to render an image of the external scene (e.g., of a person, place, object, etc. within the external scene) from which the light incident on the pixels 104 of the pixel array 102 was received.

As shown, the control circuitry 110 is coupled to the pixel array 102. In some embodiments, the control circuitry 110 controls operational characteristics of the pixel array 102. For example, the control circuitry 110 can generate the appropriate transistor control gate signals (e.g., transfer gate signals, row select signals RS0/RS1, etc.), which may be used (a) to control transfer of signals from each of the pixels 104 or (b) to control transfer of binned signals from each 10×10 block of pixels.

Figure 2:
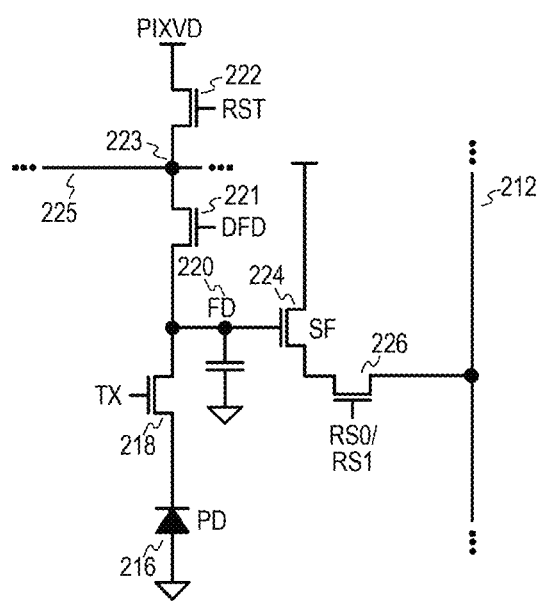
FIG. 2 illustrates one example of a schematic of one of a plurality of pixel circuits included in a pixel array in accordance with the teachings of the present technology.

FIG. 2 is a schematic circuit diagram of one example of a pixel 204 in accordance with the teachings of the present technology. The pixel 204 can be an example of one of the pixels 104 of the pixel array 102 of FIG. 1 or an example of another pixel in accordance with the teachings of the present technology, and that similarly named and numbered elements described above are coupled and function similarly below.

As shown in the depicted example, the pixel 204 shown in FIG. 2 includes a photosensor 216, a transfer transistor 218, a floating diffusion 220, a dual floating diffusion (DFD) transistor, 221, a binning node 223, a floating diffusion interconnect grid 225, a reset transistor 222, a source follower transistor 224, a row select transistor 226, and a bitline 212.

In the illustrated embodiment, the photosensor 216 is a photodiode having an anode coupled to ground (e.g., ground, a negative power supply rail, or another reference voltage) and a cathode coupled to the transfer transistor 218. In other embodiments of the present technology, the photosensor 216 may be another suitable type of photosensor or photodetector (e.g., a metal-semiconductor-metal (MSM) photodetector, a phototransistor, a photoconductive detector, or a phototube). In operation, the photosensor 216 is configured to photogenerate image charge or photocurrent in response to incident light received from an external scene.

The transfer transistor 218 selectively couples the photosensor 216 to the floating diffusion 220. In particular, the transfer transistor 218 includes a gate configured to receive a transfer signal TX. When the transfer signal TX applied to the gate of the transfer transistor 218 is asserted, the transfer transistor 218 is activated to transfer photogenerated image charge from the photosensor 216 to the floating diffusion 220.

The DFD transistor 221 selectively couples the floating diffusion 220 to a binning node 223, which is coupled to floating diffusion interconnect grid 225 as shown. As will be discussed in greater detail below, floating diffusion interconnect grid 225 is also coupled to the binning nodes 223 of all of the other similar pixels 204 in a respective 10×10 block of pixels in the pixel array (e.g., pixel array 102). As shown, the DFD transistor 221 includes a gate configured to receive a signal DFD. When the signal DFD applied to the gate of the DFD transistor 221 is asserted, the DFD transistor 221 is activated, which couples the floating diffusion 220 to the binning node 223 and therefore the binning nodes 223 of all of the other similar pixels 204 in the respective 10×10 block of pixels in the pixel array. Thus, when the DFD transistor 221 is activated, binning mode is enabled such that floating diffusion 220 of pixel 204 is coupled to binning node 223, which is coupled through the floating diffusion interconnect grid 225 to the respective binning nodes 223 and floating diffusions 220 through the DFD transistors 221 of other similar pixels 204 that are included in the respective 10×10 block of pixels. As such, the pixels included in the 10×10 block of pixels are binned when the respective DFD transistors 221 of the pixels 204 that are included in the respective 10×10 block of pixels are activated.

On the other hand, when the signal DFD applied to the gate of the DFD transistor 221 is not asserted, the DFD transistor 221 is deactivated and the floating diffusion 220 is not coupled to the binning node 223, and therefore not coupled to the binning nodes 223 of the other pixels included in the 10×10 block of pixels through the floating diffusion interconnect grid 225. Thus, when the DFD transistor 221 is deactivated, full resolution mode is enabled such that each pixel 204 can be readout individually to readout circuitry for a full resolution readout.

In the illustrated embodiment, the reset transistor 222 selectively couples the binning node 223 to a pixel voltage supply PIXVD. More specifically, the reset transistor 222 includes a gate configured to receive a reset signal RST. When the reset signal RST is asserted, the reset transistor 222 is activated to couple the binning node 223 to the pixel voltage supply PIXVD. In the various examples, the signal DFD applied to the gate of the DFD transistor 221 can be asserted while the reset signal RST applied to the gate of the reset transistor 222 is asserted. When this occurs, the DFD transistor 221 and the reset transistor 222 are activated to couple the floating diffusion 220 to the pixel voltage supply PIXVD, thereby resetting the voltage at the floating diffusion 220. In the various examples, the transfer signal TX applied to the gate of the transfer transistor 218 can be asserted while the reset signal RST applied to the gate of the reset transistor 222 is asserted and while the signal DFD applied to the gate of the DFD transistor 221 is asserted. When this occurs, the DFD transistor 221, the reset transistor 222, and the transfer transistor 218 are activated to couple the floating diffusion 220 and photosensor 216 to the pixel voltage supply PIXVD, thereby resetting the voltage at the floating diffusion 220 and the photosensor 216.

As shown in the depicted example, the floating diffusion 220 is further coupled to a gate of the source follower transistor 224. The row select transistor 226 is coupled to the source follower transistor 224 such that the source follower transistor 224 and row select transistor 226 are coupled between a voltage supply AVDD and the bitline 212 as shown. In operation, the source follower transistor 224 is configured to convert charge at the floating diffusion 220 to an analog signal at the source of the source follower transistor 224. When the signal DFD applied to the gate of the DFD transistor 221 is asserted and the DFD transistor 221 is activated, all of the floating diffusions 220 in the pixels 204 included in a respective 10×10 block of pixels are coupled together or binned through the floating diffusion interconnect grid 225 and activated DFD transistors 221 in the respective 10×10 block of pixels at the gate of the source follower transistor 224 such that a binned analog signal is provided at the source of the source follower transistor 224 for a binned readout. When the signal DFD applied to the gate of the DFD transistor 221 is not asserted and the DFD transistor 221 is deactivated, the floating diffusions 220 is not coupled to the other floating diffusions 220 of other pixels 204 included in a respective 10×10 block of pixels. As such, the analog signal provided at the source of the source follower transistor 224 is representative of charge at the floating diffusion 220 of the pixel 204 for a full resolution readout.

The row select transistor 226 selectively couples the source of the source follower transistor 224 to the bitline 212. As will be discussed in greater detail below, in the various examples, the gate of row select transistor 226 coupled to receive row select signal RS0 or row select signal RS1. As the row select signal RS0 or RS1 is asserted, the row select transistor 226 is activated to pass analog signals received from the source follower transistor 224 to the ADC in the readout circuitry (e.g., ADC 148 in readout circuitry 106). As will be discussed in greater detail below, in various examples, if the gate of row select transistor 226 is coupled to receive row select signal RS1, the DFD transistor 221 is deactivated, and the gates of row select transistors of the other pixels 204 included in the respective 10×10 block of pixels are coupled to receive row select signal RS0, the row select signals RS0 and RS1 may be asserted for a full resolution readout of pixel 204 in full resolution mode. On the other hand, as will be discussed in greater detail below, in the various examples, if the gate of row select transistor 226 is coupled to receive row select signal RS1 and the DFD transistor is activated, the row select signal RS1 may be asserted for binned readout of the pixels 204 included in the respective 10×10 block of pixels in binning mode.

Figures 3A, 3B:
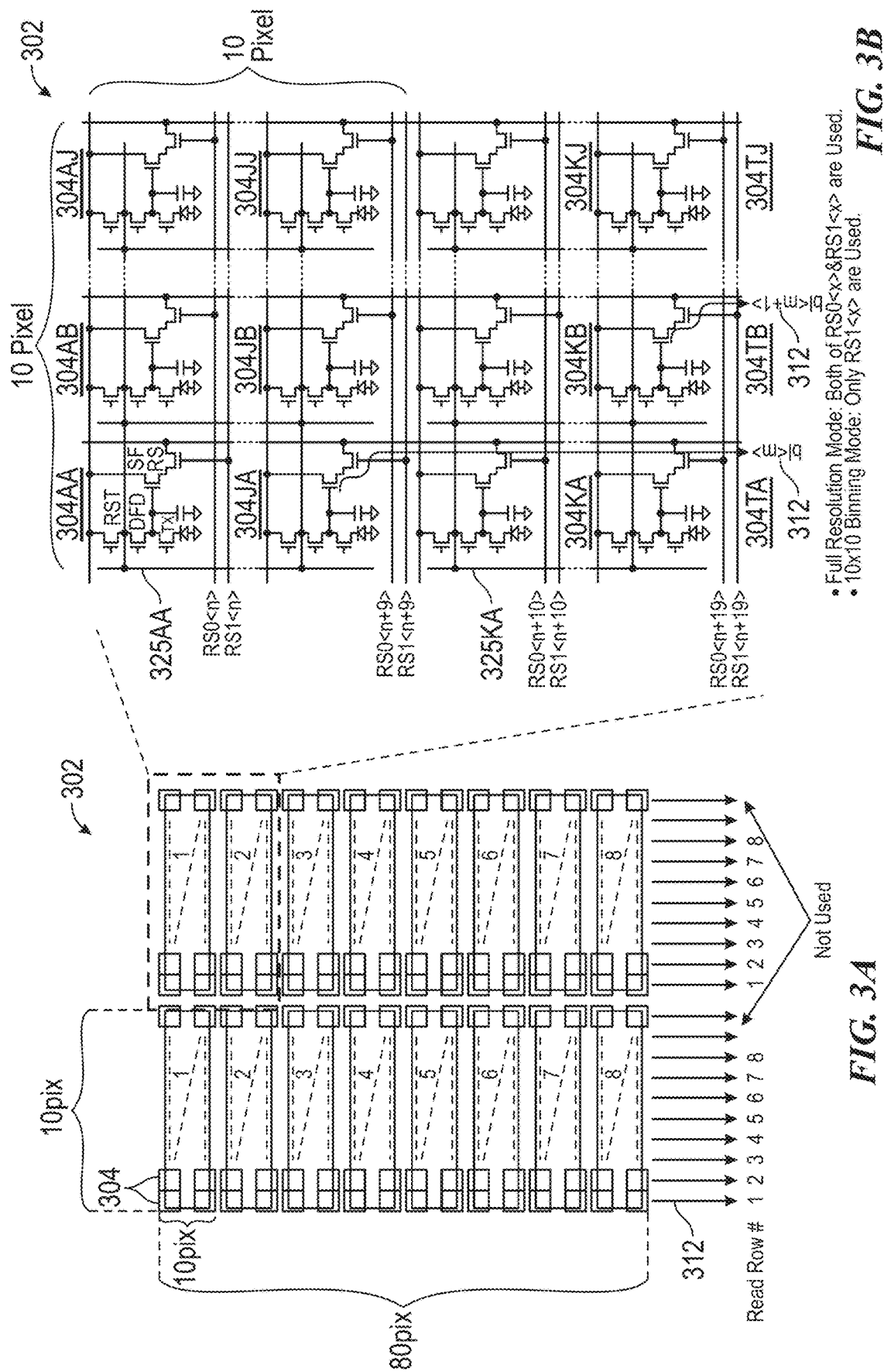
FIGS. 3A-3B illustrate example binning schemes for a pixel array in which 10×10 blocks of pixels are binned at the floating diffusions through respective floating diffusion interconnect grids inside in the 10×10 blocks of pixels in accordance with the teachings of the present technology.

To illustrate, FIGS. 3A-3B illustrate example binning schemes for a pixel array 302 in which 10×10 blocks of pixels 304 are binned at the floating diffusions through respective floating diffusion interconnect grids 325 inside in the 10×10 blocks of pixels 304 in accordance with the teachings of the present technology. It is appreciated that the example pixel arrays 302, pixels 304, bitlines 312, and floating diffusion interconnection grids 325 depicted in FIGS. 3A-3B can be an examples of the pixel array 102, pixels 104, 204, and/or floating diffusion interconnection grid 225 discussed above in FIGS. 1-2, and that similarly named and numbered elements described above are coupled and function similarly below.

As shown in the example depicted in FIG. 3A, the pixel array 302 is arranged or organized into 10×10 blocks of pixels 304. In the various examples, the pixels 304 of pixel array 302 are readout through bitlines 312. In the illustrated example, the top 10×10 blocks of pixels are labeled 1, the next 10×10 blocks of pixels are labeled 2, . . . , the eighth 10×10 blocks of pixels are labeled 8, and so on. In the various examples, full resolution readouts of each pixel 304 may be readout through corresponding bitlines 312. In addition, in the various examples, binned readouts of each 10×10 block of pixels may also be readout through corresponding bitlines. As will be discussed, the binned readouts of top 10×10 blocks of pixels that are labeled 1 are readout through the bitline 312 labeled 1, the binned readouts of the 10×10 blocks of pixels that are labeled 2 are readout through the bitline 312 labeled 2, . . . , and the binned readouts of the eighth 10×10 blocks of pixels that are labeled 8 are readout through the bitline 312 labeled 8. In the various examples, the ADC (e.g., ADC 148 of FIG. 1) is coupled to the bitlines 312 in parallel, and as such coupled to receive the binned readouts of all eight of 10×10 blocks of pixels in parallel. In other words, the ADC is configured to readout in parallel the binned signals from the eight vertical 10×10 blocks of pixels labeled 1-8 simultaneously in binning mode to achieve a high speed, super binned, ultra-low power readout of the pixel array 302 in accordance with the teachings of the present technology. As such, it is appreciated that frame time is significantly reduced, for example to 64/8*line time (e.g., 40 µs) in accordance with the teachings of the present technology. Therefore, in a 640×640 pixel array, it is appreciated that each row column ADC converts 512 binned pixels ("1"×640/80×640/10) simultaneously in accordance with the teachings of the present technology. In various examples, the 512 pixels may be readout from asynchronous static random access memory (ASRAM) sequentially, disregarding the pixel order to efficiently transmit the data from the sensor.

It is noted that since the vertical 10×10 blocks of pixels illustrated in FIG. 3A includes eight 10×10 blocks of pixels instead of ten, the bitlines 312 that are labeled 9 and 10 are not used and are therefore powered down in the depicted example for increased power consumption savings. However, it is appreciated that if ten 10×10 blocks of pixels were to be included, then the bitlines 312 that are labeled 9 and 10 could be powered up and utilized as well.

The example schematic depicted in FIG. 3B illustrates the pixels 304 of a portion of pixel array 302 in increased detail. In particular, the portion of pixel array 302 depicted in FIG. 3B illustrates the top two vertical 10×10 blocks of pixels that are labeled 1-2 shown in FIG. 3A. In particular, the top 10×10 block of pixels that is labeled 1 in FIG. 3A includes a first row of ten pixels 304AA, 304AB, . . . 304AJ, . . . to a tenth row of ten pixels that includes pixels 304JA, 304JB, . . . 304JJ. Similarly, the next vertical 10×10 block of pixels that is labeled 2 in FIG. 3A includes an eleventh row of ten pixels 304KA, 304KB, . . . 304KJ, . . . to a twentieth row of ten pixels that includes pixels 304TA, 304TB, . . . 304TJ.

Continuing with the example depicted in FIG. 3B, the row select transistors of pixels 304AB-304AJ of the first row are coupled to receive a first row select signal R0<n> while the row select transistor of pixel 304AA of the first row is coupled to receive a second row select signal R1<n>. The row select transistors of pixels 304JB-304JJ of the tenth row are coupled to receive a first row select signal R0<n+9> while the row select transistor of pixel 304JA of the tenth row is coupled to receive a second row select signal R1<n+9>.

Similarly, the row select transistors of pixels 304KA, 304KC (not shown for brevity) to 304KJ of the eleventh row are coupled to receive a first row select signal R0<n+10> while the row select transistor of pixel 304KB of the eleventh row is coupled to receive a second row select signal R1<n+10>. The row select transistors of pixels 304TA, 304TC (not shown for brevity) to 304TJ of the twentieth row are coupled to receive a first row select signal R0<n+19> while the row select transistor of pixel 304TB of the twentieth row is coupled to receive a second row select signal R1<n+19>.

Continuing further with the example depicted in FIG. 3B, the row select transistors of pixels 304AA, . . . 304JA, . . . 304KA, . . . 304TA, . . . included in the first column shown are coupled to the bitline 312 labeled bl<m> and the row select transistors of pixels 304AB, . . . 304JB, . . .

304KB, . . . 304TB, . . . included in the second column shown are coupled to the bitline 312 labeled bl<m+1>.

The example depicted in FIG. 3B also illustrates floating diffusion interconnect grid 325AA, which is coupled to the binning nodes of each of the pixels 304AA-304JJ that are included in the first vertical 10×10 block of pixels that is labeled 1 as shown in FIG. 3A. Similarly, floating diffusion interconnect grid 325KA is coupled to the binning nodes of each of the pixels 304KA-304TJ that are included in the second vertical 10×10 block of pixels that is labeled 2 as shown in FIG. 3A.

As discussed above, in full resolution mode operation, the DFD transistors in each of the pixels 304 are deactivated. Therefore, it is appreciated that in full resolution mode operation, the first row select signals RS0 and the second row select signals RS1 may both be used to control the row select transistors of the pixels 304 for full resolution readouts of all of the pixels 304 included in pixel array 302 in accordance with the teachings of the present technology.

As discussed above, in binning mode operation, the DFD transistors in each of the pixels 304 are activated. As such, the floating diffusions of all of the pixels 304AA-304JJ that are included in the first vertical 10×10 block of pixels that is labeled 1 are coupled together or binned through floating diffusion interconnect grid 325AA. Similarly, the floating diffusions of all of the pixels 304KA-304TJ that are included in the second vertical 10×10 block of pixels that is labeled 2 are coupled together or binned through floating diffusion interconnect grid 325KA.

In one example, a binned readout of each 10×10 block of pixels may be readout out through a designated source follower transistor and row select transistor through a separate bitline. In one example, the binned signal of the pixels 304AA-304JJ that are included in the first vertical 10×10 block of pixels that is labeled 1 are readout through the designated single source follower transistor and row select transistor of pixel 304JA through the bitline 312 bl<m>. In this example, the second row select signal RS1<n+9> is configured to activate the designated row select transistor of pixel 304JA to readout the binned signal. In the example, the first row select signals RS0 and the other second row select signals RS1<n> to RS1<n+8> are not used. Similarly, the binned signal of the pixels 304KA-304TJ that are included in the second vertical 10×10 block of pixels that is labeled 2 are readout through the designated single source follower transistor and row select transistor of pixel 304TB through the bitline 312 bl<m+1>. In this example, the second row select signal RS1<n+19> is configured to activate the designated row select transistor of pixel 304TB to readout the binned signal. In the example, the first row select signals RS0 and the other second row select signals RS1<n+10> to RS1<n+18> are not used. Since separate or designated bitlines 312 bl<m>, 312 bl<m+1>, etc. are utilized to readout the respective 10×10 blocks of pixels, it is appreciated that the binned signals from the 10×10 blocks may be readout simultaneously to achieve a high speed, super binned, ultra-low power readout of the pixel array 302 in accordance with the teachings of the present technology.

In another example, it is appreciated that a binned readout of each 10×10 block of pixels may be readout out through two or more source follower transistors and row select transistors that are coupled to a separate bitline for each respective 10×10 block of pixels. For instance, the binned signal of the pixels 304AA-304JJ that are included in the first vertical 10×10 block of pixels that is labeled 1 are readout through the two or more source follower transistors and row select transistors of pixels 304AA-304JJ through the bitline 312 bl<m>. In this example, two or more of the second row select signals RS1<n> to RS1<n+9> are configured to activate the respective row select transistors in the corresponding column of pixels 304AA, . . . 304JA that are coupled to bitline 312 bl<m>. The first row select signals RS0 are not used during binning mode readouts. Similarly, the binned signal of the pixels 304KA-304TJ that are included in the second vertical 10×10 block of pixels that is labeled 2 are readout through the two or more source follower transistors and row select transistors of pixels 304KA-304TJ through the bitline 312 bl<m+1>. In this example, two or more of the second row select signals RS1<n+10> to RS1<n+19> are configured to activate the respective row select transistors in the corresponding column of pixels 304KB, . . . 304TB that are coupled to bitline 312 bl<m+1>. The first row select signals RS0 are not used during binning mode readouts. Since separate or designated bitlines 312 bl<m>, 312 bl<m+1>, . . . etc. are utilized to readout the respective 10×10 blocks of pixels, it is appreciated that the binned signals from the 10×10 blocks may be readout simultaneously to achieve a high speed, super binned, ultra-low power readout of the pixel array 302 in accordance with the teachings of the present technology.

Figure 4:
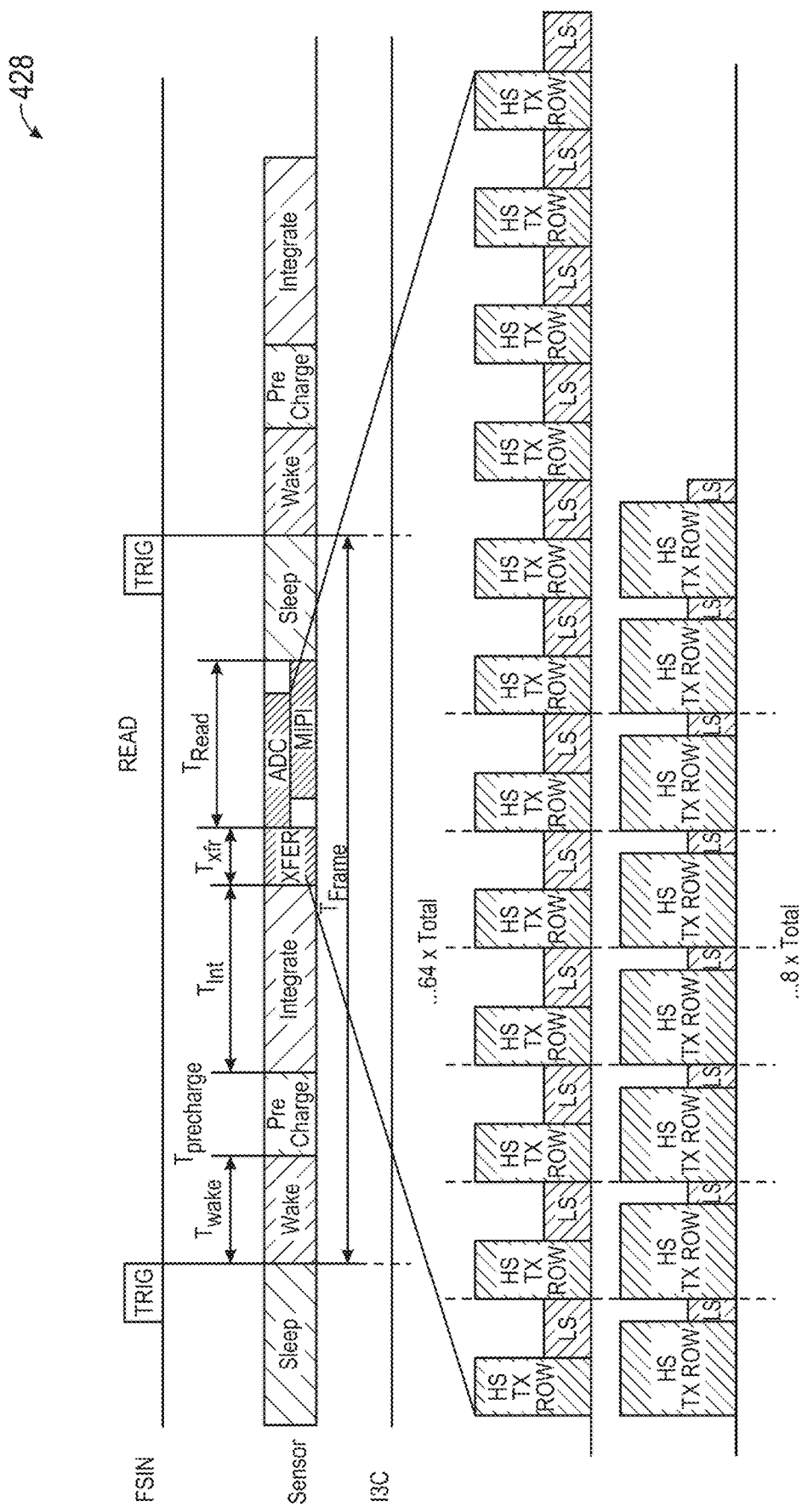
FIG. 4 illustrates an example timing diagram that shows the improved readout times with reduced power consumption of a pixel array including 10×10 blocks of pixels that are binned at the floating diffusions inside of the pixels included in the 10×10 blocks of pixels in accordance with the teachings of the present technology.

FIG. 4 illustrates an example timing diagram 428 that shows the improved readout times with reduced power consumption of a pixel array including 10×10 blocks of pixels that are binned at the floating diffusions inside of the pixels included in the 10×10 blocks of pixels in accordance with the teachings of the present technology.

In the illustrated example, the trigger event (TRIG) in the frame sync (FSIN) input indicates the end of a sleep period as indicated for the sensor. After the end of the sleep period, a readout period occurs in the sensor. The readout period includes a wake period having a period $T_{wake}$, followed by a precharge period have a period $T_{precharge}$, an integrate period having a period Tint, a transfer period having a period $T_{xfr}$, a read period having a period $T_{Read}$, and a sleep period. As shown, the sleep period ends in response to another trigger event TRIG in the frame sync input.

The illustrated example shows that the read period begins with an ADC period that overlaps with a MIPI period that ends the read period. In the depicted example, the ADC period of the read period is expanded to illustrate the difference between a traditional binned read compared to an efficient super-binned ultra-low power readout of an example 640×640 pixel array in accordance with the teachings of the present technology. For instance, in a traditional binned readout, typical binning methods to get binned 64×64 pixels involves 10 rows of pixels binned vertically with source follower transistors and 10 columns of pixels binned horizontally in columns. In these traditional examples, 10×10 pixels readout in parallel with an ADC 64 times for the 640×640 pixel array. The example depicted in FIG. 4 illustrates the high speed (HS) data transmission period, which typically corresponds to high power consumption, and the low speed (LS) or low power period that occurs with each of the 64× total readouts. Typical frame times to readout rows 64 times would therefore be for example 64*5 μs, or approximately 320 μs.

The example depicted in FIG. 4 also illustrates the improved efficient super-binned ultra-low power readout of the example 640×640 pixel array below the traditional example for comparison. As shown and described in the previous examples in which binned readouts of eight 10×10 blocks of pixels are readout simultaneously, only eight readouts are required. The example also illustrates the high speed (HS) data transmission period and the low speed (LS)

period that occurs with each of the 8× total readouts. It is noted that the HS duration for each of the improved 8× readouts may be longer than the corresponding HS duration for each of the traditional 64× readouts, but overall power consumption is still reduced. Thus, a significant time savings and therefore a significant power consumption savings are achieved in accordance with the teachings of the present technologies. In various examples, with the simultaneous binned readouts of the 10×10 blocks described above, the readout period is significantly reduced by 64/8 or 8*line times (e.g., approximately 40 µs).

C. CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where context permits, singular or plural terms may also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on." Also, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A pixel, comprising:
    a photosensor configured to photogenerate charge in response to incident light;
    a floating diffusion configured to receive the charge photogenerated by the photosensor;
    a transfer transistor coupled between the floating diffusion and the photosensor;
    a dual floating diffusion (DFD) transistor coupled to the floating diffusion;
    a binning node coupled to the DFD transistor; and
    a floating diffusion interconnect grid coupled to the binning node of the pixel and a binning node of a second pixel, wherein the pixel and the second pixel are included in a plurality of pixels of a pixel array,
    wherein the DFD transistor is configured to couple the binning node to the floating diffusion when activated during a readout operation of the pixel array to provide a binned readout of the pixel and the second pixel,
    wherein the DFD transistor is configured not to couple the binning node to the floating diffusion when deactivated during the readout operation of the pixel array to provide a full resolution readout of the pixel and the second pixel.

2. The pixel of claim 1, further comprising:
    a source follower transistor having a gate coupled to the floating diffusion; and
    a row select transistor coupled to the source follower transistor, wherein the source follower transistor and the row select transistor are coupled between a voltage supply and a bitline.

3. The pixel of claim 2, wherein the row select transistor is configured to be activated in response to one of a first row select signal and a second row select signal during the readout operation to provide the full resolution readout of the pixel when the DFD transistor is deactivated.

4. The pixel of claim 2, wherein the row select transistor is configured to be activated in response to a second row select signal during the readout operation to provide the binned readout of the pixel and the second pixel when the DFD transistor is activated and a row select transistor of the second pixel is deactivated.

5. The pixel of claim 2, wherein a row select transistor of the second pixel is configured to be activated in response to a second row select signal during the readout operation to provide the binned readout of the pixel and the second pixel when the DFD transistor is activated and the row select transistor of the pixel is deactivated.

6. The pixel of claim 2, wherein the bitline is a first bitline of a plurality of bitlines, wherein the row select transistor is configured to be activated in response to a second row select signal during the readout operation to provide the binned readout of the pixel and the second pixel when the DFD transistor is activated, wherein a row select transistor of the second pixel is coupled to the first bitline, wherein the row select transistor of the second pixel is activated in response to the second row select signal, wherein a row select transistor of a third pixel is coupled to a second bitline of the plurality of bitlines, wherein the row select transistor of the third pixel is deactivated in response to a first row select signal.

7. The pixel of claim 1, wherein the plurality of pixels includes 100 pixels included in a 10×10 block of pixels in the pixel array, wherein the floating diffusion interconnect grid is coupled to a respective binning node included in each one of the plurality of pixels.

8. The pixel of claim 1, further comprising a reset transistor coupled between a pixel voltage supply and the binning node.

9. An imaging system, comprising:
a pixel array comprising a plurality of pixels arranged in rows and columns and a floating diffusion interconnect grid coupled to the plurality of pixels, wherein each of the pixels comprises:
a photosensor configured to photogenerate charge in response to incident light;
a floating diffusion configured to receive the charge photogenerated by the photosensor;
a transfer transistor coupled between the floating diffusion and the photosensor;
a dual floating diffusion (DFD) transistor coupled to the floating diffusion; and
a binning node coupled to the DFD transistor;
a control circuitry coupled to the pixel array to control operation of the pixel array; and
a readout circuit coupled to receive a binned readout or a full resolution readout from the pixel array,
wherein the floating diffusion interconnect grid is coupled to the binning node of each of the pixels,
wherein the DFD transistor of each of the pixels is configured to couple the binning node to the floating diffusion when activated during a readout operation of the pixel array to provide the binned readout of the pixel array, and
wherein the DFD transistor of each of the pixels is configured not to couple the binning node to the floating diffusion when deactivated during the readout operation of the pixel array to provide the full resolution readout of the pixel array.

10. The imaging system of claim 9, further comprising function logic coupled to the readout circuit to store and to process digital representations of image charge values from the pixel array.

11. The imaging system of claim 9, wherein each of the pixels further comprises:
a source follower transistor having a gate coupled to the floating diffusion; and
a row select transistor coupled to the source follower transistor,
wherein the source follower transistor and the row select transistor of each of the pixels are coupled between a voltage supply and one of a plurality of bitlines.

12. The imaging system of claim 11, wherein the row select transistors of the pixels are configured to be activated in response to first or second row select signals during the readout operation to provide the full resolution readout of the pixel array when the DFD transistor of each of the pixels is deactivated.

13. The imaging system of claim 11, wherein a row select transistor of one of the pixels is configured to be activated in response to a second row select signal during the readout operation to provide the binned readout of the pixel array when the DFD transistor of each of the pixels is activated and the row select transistors of remaining ones of the pixels are deactivated.

14. The imaging system of claim 11, wherein the row select transistors of a second subset of the plurality of pixels are configured to be activated in response to second row select signals during the readout operation to provide the binned readout of the pixel array when the DFD transistor of each of the pixels is activated and the row select transistors of a first subset of the plurality of pixels are deactivated.

15. The imaging system of claim 11, wherein a row select transistor of a first pixel of the pixels is coupled to a first bitline of the plurality of bitlines, wherein the row select transistor of the first pixel is configured to be activated in response to a second row select signal during the readout operation to provide the binned readout of the pixel array when the DFD transistor of each of the pixels is activated, wherein a row select transistor of a second pixel of the pixels is coupled to the first bitline, wherein the row select transistor of the second pixel is activated in response to the second row select signal, wherein a row select transistor of a third pixel of the pixels is coupled to a second bitline of the plurality of bitlines, wherein the row select transistor of the third pixel is deactivated in response to a first row select signal.

16. The imaging system of claim 9, wherein the plurality of pixels includes 100 pixels included in a 10×10 block of pixels in the pixel array.

17. The imaging system of claim 9, wherein each of the pixels further comprises a reset transistor coupled between a pixel voltage supply and the binning node.

18. The imaging system of claim 11, wherein:
the plurality of pixels comprises a first plurality of pixels,
the pixel array further comprises a second plurality of pixels,
the row select transistors of a subset of the first plurality of pixels are coupled to a first bitline of the plurality of bitlines, and are configured to be activated in response to first row select signals during the readout operation to provide binned readout of the first plurality of pixels when the DFD transistor of each of the first plurality of pixels is activated, and
the row select transistors of a subset of the second plurality of pixels are coupled to a second bitline of the plurality of bitlines, and are configured to be activated in response to second row select signals during the readout operation to provide binned readout of the second plurality of pixels when the DFD transistor of each of the second plurality of pixels is activated.

19. The imaging system of claim 18, wherein the readout circuit is coupled to the first and second bitlines, and is configured to receive the binned readout of the first plurality of pixels and the binned readout of the second plurality of pixels in parallel simultaneously.

20. The imaging system of claim 18, wherein the row select transistors of the subset of the first plurality of pixels are configured to be activated during the readout operation to provide binned readout of the first plurality of pixels when the row select transistors of remaining ones of the first plurality of pixels are deactivated, and wherein the row select transistors of the subset of the second plurality of pixels are configured to be activated during the readout operation to provide binned readout of the second plurality of pixels when the row select transistors of remaining ones of the second plurality of pixels are deactivated.

\* \* \* \* \*